(12) United States Patent
Nakano et al.

(10) Patent No.: US 6,852,777 B1
(45) Date of Patent: Feb. 8, 2005

(54) WATER-BASED INK FOR INK-JET RECORDING

(75) Inventors: Yukihiro Nakano, Wakayama (JP); Isao Tsuru, Wakakayama (JP); Kohji Azuma, Wakayama (JP); Michitaka Sawada, Wakayama (JP); Takehiro Tsutsumi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/623,166

(22) PCT Filed: Dec. 28, 1999

(86) PCT No.: PCT/JP99/07373

§ 371 (c)(1),
(2), (4) Date: Aug. 28, 2000

(87) PCT Pub. No.: WO00/39226

PCT Pub. Date: Jul. 6, 2000

(30) Foreign Application Priority Data

Dec. 28, 1998 (JP) .......................................... 10-372508
Aug. 9, 1999 (JP) .......................................... 11-225693
Sep. 10, 1999 (JP) .......................................... 11-256638

(51) Int. Cl.[7] .......................... C09D 11/10; C08L 25/08
(52) U.S. Cl. ...................................... 523/160; 524/577
(58) Field of Search .............................. 523/160, 161; 106/31.6; 526/279, 307.5, 307.7; 524/588, 577, 556, 548; 528/26, 27, 31

(56) References Cited

U.S. PATENT DOCUMENTS

| 5,405,900 A | * 4/1995 | Jenkins et al. ............... 524/556 |
| 5,631,309 A | 5/1997 | Yanagi et al. |
| 5,702,510 A | 12/1997 | Yoshida et al. |
| 5,708,095 A | * 1/1998 | Grezzo Page et al. ...... 525/301 |
| 5,736,606 A | 4/1998 | Yanagi et al. |
| 5,852,074 A | 12/1998 | Tsutsumi et al. |
| 5,877,235 A | 3/1999 | Sakuma et al. |
| 5,998,501 A | 12/1999 | Tsutsumi et al. |
| 6,005,023 A | * 12/1999 | Anton et al. ................. 523/161 |
| 6,031,019 A | * 2/2000 | Tsutsumi et al. ........... 523/160 |
| 6,174,357 B1 | * 1/2001 | Kappele ................... 106/31.77 |
| 6,232,369 B1 | * 5/2001 | Ma et al. ..................... 523/161 |

FOREIGN PATENT DOCUMENTS

| EP | 719610 | * 6/1997 |
| EP | 781819 | * 7/1997 |
| EP | 879858 | * 11/1998 |
| JP | 10338829 | 12/1998 |

* cited by examiner

*Primary Examiner*—Callie Shosho
(74) *Attorney, Agent, or Firm*—Oblon, Spivak, McClelland, Maier & Neustadt, P.C.

(57) ABSTRACT

A water-based ink for inkjet printing comprising a water dispersion of vinyl polymer particles prepared by containing a pigment in a vinyl polymer prepared by copolymerizing a monomer mixture comprising (a) a salt-forming group-containing monomer, (b) a macromer, and (c) a monomer copolymerizable with the salt-forming group-containing monomer and the macromer; and a process for preparing a water-based ink for inkjet printing comprising a water dispersion of vinyl polymer particles prepared by containing a pigment in a vinyl polymer, comprising dissolving in an organic solvent a vinyl polymer prepared by copolymerizing a monomer mixture comprising (a) a salt-forming group-containing monomer, (b) a macromer, and (c) a monomer copolymerizable with the salt-forming group-containing monomer and the macromer; adding a pigment to the resulting solution; pre-kneading the mixture; thereafter adding a neutralizing agent and water and kneading the mixture, to give an oil-in-water dispersion; and distilling off the organic solvent from the resulting kneaded product.

6 Claims, No Drawings

WATER-BASED INK FOR INK-JET RECORDING

TECHNICAL FIELD

The present invention relates to a water-based ink for inkjet printing.

BACKGROUND ART

Inkjet printing system is a printing system comprising directly jetting ink droplets from very fine nozzles, and depositing the ink droplets on a recording medium to give characters and images. This system has advantages that not only the used device shows a low level of noise and has excellent operability, but also the coloration is facilitated and plain paper can be used as a recording medium. Therefore, this system has been widely used in the recent years.

In an ink used for inkjet printers, water-soluble dyes and polyhydric alcohols are used in order to prevent the ink from being clogged in the nozzles. However, this ink is poor in water resistance and light fastness. Especially, when the ink is used as an ink for thermal jet system, there arise defects such that the dye is oxidized due to the heat of a heater surface, and that the ink is easily scorched on the heater surface, thereby lowering the discharging ability.

In order to eliminate this defect, there has been proposed an ink comprising a water dispersion of a vinyl polymer having a specified structure in which a hydrophobic dye is incorporated (Japanese Patent Laid-Open Nos. Hei 9-241565 and Hei 9-286939). However, this ink has defects that light fastness and printing density are insufficient because dye is used.

An object of the present invention is to provide a water-based ink for inkjet printing which is excellent in light fastness, imparts high printing density, gives a recording medium no distortions, and is excellent in water resistance, rub resistance, and highlighter-fastness.

DISCLOSURE OF INVENTION

According to the present invention, there are provided:
(1) a water-based ink for inkjet printing comprising a water dispersion of vinyl polymer particles prepared by containing a pigment in a vinyl polymer prepared by copolymerizing a monomer mixture comprising (a) a salt-forming group-containing monomer, (b) a macromer, and (c) a monomer copolymerizable with the salt-forming group-containing monomer and the macromer; and
(2) a process for preparing a water-based ink for inkjet printing comprising a water dispersion of vinyl polymer particles prepared by containing a pigment in a vinyl polymer, comprising dissolving in an organic solvent a vinyl polymer prepared by copolymerizing a monomer mixture comprising (a) a salt-forming group-containing monomer, (b) a macromer, and (c) a monomer copolymerizable with the salt-forming group-containing monomer and the macromer; adding a pigment to the resulting solution; pre-kneading the mixture; thereafter adding a neutralizing agent and water and kneading the mixture, to prepare a water-in-oil dispersion; and distilling off the organic solvent from the resulting kneaded product.

BEST MODE FOR CARRYING OUT THE INVENTION

The monomer mixture comprises (a) a salt-forming group-containing monomer [hereinafter referred to as component (a)], (b) a macromer [hereinafter referred to as component (b)], and (c) a monomer copolymerizable with component (a) and component (b) [hereinafter referred to as component (c)].

The component (a) includes cationic monomers and anionic monomers. Examples thereof include those listed in Japanese Patent Laid-Open No. Hei 9-286939, page 5, column 7, line 24 to column 8, line 29, and the like.

Representative examples of the cationic monomers include unsaturated tertiary amine-containing monomers, unsaturated ammonium salt-containing monomers, and the like. Among them, N,N-dimethylaminoethyl (meth)acrylate, N-(N',N'-dimethylaminopropyl) (meth)acrylamide and vinylpyrrolidone are preferable.

Representative examples of the anionic monomers include unsaturated carboxylic acid monomers, unsaturated sulfonic acid monomers, unsaturated phosphoric acid monomers, and the like. Among them, unsaturated carboxylic acid monomers such as acrylic acid and methacrylic acid are preferable.

The component (b) includes macromers, which are monomers having a polymerizable unsaturated group, and a number-average molecular weight of 500 to 100000, preferably 1000 to 10000. Among them, silicone macromers represented by the formula (II):

wherein X is a polymerizable unsaturated group; Y is a divalent bond group; each of $R^4$ is independently hydrogen atom, a lower alkyl group, an aryl group or an alkoxy group; Z is a monovalent siloxane polymer residue having a number-average molecular weight of not less than 500; q is 0 or 1; and r is an integer of 1 to 3; and/or styrene macromers having a polymerizable functional group at one end are preferable.

The number-average molecular weight of the component (b) is determined by gel chromatography using 1 mmol/L of dodecyldimethylamine-containing chloroform as a solvent with polystyrene as a standard substance.

The silicone macromer can be favorably used from the viewpoint of preventing the head of an inkjet printer from scorching.

In the silicone macromers represented by the formula (II), X includes monovalent unsaturated hydrocarbon groups having 2 to 6 carbon atoms such as $CH_2=CH-$ group and $CH_2=C(CH_3)-$ group. Y includes divalent bond groups such as $-COO-$ group, $-COOC_aH_{2a}-$ group (a being an integer of 1 to 5) and phenylene group, and $-COOC_3H_6-$ is preferable. $R^4$ includes hydrogen atom; lower alkyl groups having 1 to 5 carbon atoms such as methyl group and ethyl group; aryl groups having 6 to 20 carbon atoms such as phenyl group; and alkoxy groups having 1 to 20 carbon atoms such as methoxy group. Among them, methyl group is preferable. Z is preferably a monovalent residue of dimethylsiloxane polymer having a number-average molecular weight of 500 to 5000. q is 0 or 1, preferably 1. r is an integer of 1 to 3, preferably 1.

Representative examples of the silicone macromers include silicone macromers represented by the formula (II-1):

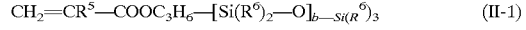

wherein $R^5$ is hydrogen atom or methyl group; each of $R^6$'s is independently hydrogen atom, or a lower alkyl group having 1 to 5 carbon atoms; b is a number of 5 to 60;

silicone macromers represented by the formula (II-2):

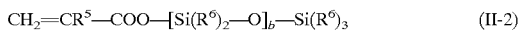

$$CH_2=CR^5-COO-[Si(R^6)_2-O]_b-Si(R^6)_3 \quad (II\text{-}2)$$

wherein $R^5$, $R^6$ and b are as defined above;
silicone macromers represented by the formula (II-3):

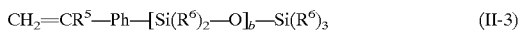

$$CH_2=CR^5-Ph-[Si(R^6)_2-O]_b-Si(R^6)_3 \quad (II\text{-}3)$$

wherein Ph is phenylene group; and $R^5$, $R^6$ and b are as defined above;
silicone macromers represented by the formula (II-4):

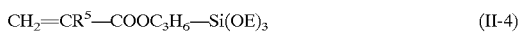

$$CH_2=CR^5-COOC_3H_6-Si(OE)_3 \quad (II\text{-}4)$$

wherein $R^5$ is as defined above; and E is a $-[Si(R^5)_2O]_c-Si(R^5)_3$ group, wherein $R^5$ is as defined above, and c is a number of 5 to 65, and the like.

Among them, the silicone macromers represented by the formula (II-1) are preferable, and especially preferable are silicone macromers represented by the formula (II-1a):

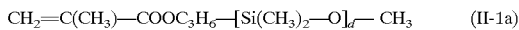

$$CH_2=C(CH_3)-COOC_3H_6-[Si(CH_3)_2-O]_d-CH_3 \quad (II\text{-}1a)$$

wherein d is a number of 8 to 40. An example thereof includes FM-0711 (trade name, manufactured by CHISSO CORPORATION), and the like.

The styrene macromers can be favorably used from the viewpoint of sufficiently containing the pigment in the vinyl polymer.

The styrene macromers include styrene homopolymers having a polymerizable functional group at one end, or copolymers of styrene and other monomers. Among them, those having acryloyloxy group or methacryloyloxy group as a polymerizable functional group at one end are preferable. It is desired that the styrene content in the above copolymer is not less than 60% by weight, preferably not less than 70% by weight, from the viewpoint for sufficiently containing the pigment in the vinyl polymer. The above other monomers include acrylonitrile, and the like.

The component (c) includes (meth)acrylic acid esters such as methyl (meth)acrylate, ethyl (meth)acrylate, (iso)propyl (meth)acrylate, (iso- or tertiary-)butyl (meth)acrylate, (iso) amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene, and the like, each of which can be used alone or in admixture of at least two kinds. The above terms (iso- or tertiary-) and (meth) mean both cases where these groups are present and where they are absent. When these groups are absent, the group means a normal- group.

Incidentally, it is preferable that the component (c) contains the styrenic monomer, from the viewpoints of improvements in printing density and highlighter-fastness. As the styrenic monomers, styrene and 2-methylstyrene are preferable, and these may be used alone or in combination. In this case, it is desired that the content of the styrenic monomers in the component (c) is 10 to 100% by weight, preferably 40 to 100% by weight, from the viewpoints of improvements in printing density and highlighter-fastness.

In addition, the monomer mixture may contain at least one member selected from the group consisting of (d) a hydroxyl group-containing monomer [hereinafter referred to as "component (d)"], and (e) a monomer represented by the formula (I):

$$CH_2=C(R^1)COO(R^2O)_pR^3 \quad (I)$$

wherein $R^1$ is hydrogen atom or a lower alkyl group; $R^2$ is a divalent hydrocarbon group having 1 to 30 carbon atoms, which may have a hetero-atom; $R^3$ is a monovalent hydrocarbon group having 1 to 30 carbon atoms, which may have a hetero-atom; and p is a number of 1 to 60,
[hereinafter referred to as "component (e)"].

The component (d) includes 2-hydroxyethyl (meth) acrylate, 3-hydroxypropyl (meth)acrylate, polyethylene glycol(n=2 to 30) (meth)acrylate, poly(ethylene glycol(n=1 to 15)●propylene glycol(n=1 to 15)) (meth)acrylate, and the like. Among them, 2-hydroxyethyl (meth)acrylate is preferable.

The component (e) exhibits excellent effects of enhancing discharging stability of the water-based ink of the present invention, and suppressing generation of wrinkles even when subjected to continuous printing.

In the formula (I), $R^1$ is hydrogen atom or a lower alkyl group. The lower alkyl group includes an alkyl group having 1 to 4 carbon atoms.

$R^2$ is a divalent hydrocarbon group having 1 to 30 carbon atoms, which may have a hetero-atom. The hetero-atom includes, for instance, nitrogen atom, oxygen atom, a halogen atom and sulfur atom.

Representative examples of $R^2$ include an aromatic ring having 6 to 30 carbon atoms which may have a substituent; a heterocyclic ring having 3 to 30 carbon atoms which may have a substituent; an alkylene group having 1 to 30 carbon atoms which may have a substituent, and these rings or groups may be a combination of at least two kinds. The substituent includes an aromatic ring having 6 to 29 carbon atoms; a heterocyclic ring having 3 to 29 carbon atoms; an alkyl group having 1 to 29 carbon atoms; a halogen atom; amino group, and the like.

Suitable examples of $R^2$ include phenylene group which may have a substituent having 1 to 24 carbon atoms; an aliphatic alkylene group having 1 to 30 carbon atoms, preferably 1 to 20 carbon atoms; an alkylene group having 7 to 30 carbon atoms having an aromatic ring; and an alkylene group having 4 to 30 carbon atoms having a heterocyclic ring.

In addition, preferable examples of $R^2O$ group include ethylene oxide group, (iso)propylene oxide group, tetramethylene oxide group, heptamethylene oxide group, hexamethylene oxide group, and an alkylene oxide group having 2 to 7 carbon atoms composed of combinations of at least one of these alkylene oxides, and phenylene oxide group.

$R^3$ is a monovalent hydrocarbon group having 1 to 30 carbon atoms, which may have a hetero-atom. The hetero-atom includes, for instance, nitrogen atom, oxygen atom and sulfur atom.

Representative examples of $R^3$ include an aromatic ring having 6 to 30 carbon atoms which may have a substituent; a heterocyclic ring having 3 to 30 carbon atoms which may have a substituent; or an alkyl group having 1 to 30 carbon atoms which may have a substituent. The substituent includes an aromatic ring having 6 to 29 carbon atoms; a heterocyclic ring having 4 to 29 carbon atoms; a halogen atom; amino group, and the like.

Suitable examples of $R^3$ include phenyl group; an aliphatic alkyl group having 1 to 30 carbon atoms, preferably 1 to 20 carbon atoms; an alkyl group having 7 to 30 carbon atoms having an aromatic ring; and an alkyl group having 4 to 30 carbon atoms having a heterocyclic ring.

More preferable examples of $R^3$ include alkyl groups having 1 to 6 carbon atoms such as methyl group, ethyl group, (iso)propyl group, (iso)butyl group, (iso)pentyl group and (iso)hexyl group, phenyl group, and the like.

p is a number of 1 to 60, and especially a number of 1 to 30 is preferable.

Concrete examples of the component (e) include methoxypolyethylene glycol(1 to 30: showing the value for p in the formula (I), hereinafter referred to the same) (meth)acrylate, methoxypolytetramethylene glycol(1 to 30) (meth)acrylate, ethoxypolyethylene glycol(1 to 30) (meth)acrylate, (iso)propoxypolyethylene glycol(1 to 30) (meth)acrylate, butoxypolyethylene glycol(1 to 30) (meth)acrylate, methoxypolypropylene glycol(1 to 30) (meth)acrylate, methoxypoly(ethylene glycol●propylene glycol)(1 to 30, in which ethylene glycol moiety is 1 to 29) (meth)acrylate, and the like. Each of these can be used alone or in admixture of at least two kinds. Among them, methoxypolyethylene glycol(1 to 30) (meth)acrylate is preferable. The term "(meth)acylate" in the present specification means acrylate or methacrylate. In addition, the term "(iso)propoxy" means n-propoxy or isopropoxy.

It is desired that the content of the component (a) in the vinyl polymer is 1 to 50% by weight, preferably 2 to 40% by weight, from the viewpoint of the dispersion stability of the resulting dispersion.

It is desired that the content of the component (b) in the vinyl polymer is 1 to 25% by weight, preferably 5 to 20% by weight, from the viewpoints of suppression of scorching on the heater surface of the inkjet printer and stability.

It is desired that the content of the component (c) in the vinyl polymer is 5 to 93% by weight, preferably 10 to 80% by weight, from the viewpoints of suppression of scorching on the heater surface of the inkjet printer and stability. When the component (c) containing a styrenic monomer is used, it is preferable that the content of the component (c) in the vinyl polymer is 10 to 60% by weight.

It is desired that the content of the component (d) in the vinyl polymer is 5 to 40% by weight, preferably 7 to 20% by weight, from the viewpoints of discharging stability and printing density. In addition, it is desired that the total content of the component (a) and the component (d) is 6 to 60% by weight, preferably 10 to 50% by weight, from the viewpoints of stability in water and water resistance.

It is desired that the content of the component (e) in the vinyl polymer is 5 to 50% by weight, preferably 10 to 40% by weight, from the viewpoints of discharging stability and dispersion stability.

In addition, it is preferable that a total content of the component (a) and the component (e) is 6 to 75% by weight, from the viewpoints of dispersion stability in water and discharging stability.

In addition, it is desired that a total content of the component (a), the component (d) and the component (e) is 6 to 60% by weight, preferably 7 to 50% by weight, from the viewpoints of dispersion stability in water and discharging stability.

The vinyl polymer is prepared by copolymerizing the monomer mixture by a known polymerization method such as bulk polymerization method, solution polymerization method, suspension polymerization method, or emulsion polymerization method. Among these polymerization methods, the solution polymerization method is preferable.

The solvent used in the solution polymerization method is preferably a polar organic solvent, and a water-miscible organic solvent can also be used by mixing with water. The organic solvent includes, for instance, aliphatic alcohols having 1 to 3 carbon atoms such as methanol, ethanol and propanol; ketones such as acetone and methyl ethyl ketone; esters such as ethyl acetate, and the like. Among them, methanol, ethanol, acetone, methyl ethyl ketone or a liquid mixture of these solvents with water are preferable.

During polymerization, a radical polymerization initiator can be used. As the radical polymerization initiator, azo compounds such as 2,2'-azobisisobutyronitrile, 2,2'-azobis (2,4-dimethylvaleronitrile), dimethyl-2,2'-azobisbutyrate, 2,2'-azobis(2-methylvaleronitrile), and 1,1 '-azobis(1-cyclohexanecarbonitrile) are preferable. In addition, organic peroxides such as t-butyl peroxyoctoate, di-t-butyl peroxide and dibenzoyl oxide can also be used.

It is preferable that the amount of the polymerization initiator is 0.001 to 5% by mol, especially 0.01 to 2% by mol, of the monomer mixture.

During the polymerization, a polymerization chain transfer agent may be further added. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran, and the like. These can be used alone or in combination of at least two kinds.

Although the conditions for polymerizing the monomer mixture are different depending upon the kinds of the radical polymerization initiators used, the monomers, and the solvent, the polymerization temperature is usually 30° to 100° C., preferably 50° to 80° C., and the polymerization time period is 1 to 20 hours. In addition, it is preferable that the polymerization atmosphere is an inert gas atmosphere such as nitrogen gas.

After termination of the polymerization reaction, the copolymer can be isolated from the reaction solution by a known method such as re-precipitation and distilling off of the solvent. In addition, the resulting copolymer can be purified by the removal of unreacted monomers by the repeat of re-precipitation, membrane separation, chromatography, extraction method, or the like.

The weight-average molecular weight of the vinyl polymer (determined in accordance with the method described in the subsequent Preparation Examples 1 to 11 given below) is preferably 3000 to 200000, more preferably 5000 to 100000, from the viewpoints of discharging property, prevention of scorching onto the printer head, durability of ink after printing, and stability of the dispersion.

The pigment may be an inorganic pigment or an organic pigment. In addition, an extender can be used together therewith, as occasion demands.

The inorganic pigment includes carbon black, metal oxides, metal sulfides, metal chlorides, and the like. Among them, especially among the black water-based ink, carbon black is preferable. The carbon black includes furnace black, thermal lamp black, acetylene black, channel black, and the like.

The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments, and the like.

The extender includes silica, calcium carbonate, talc, and the like.

It is desired that the amount of the pigment is 20 to 400 parts by weight, preferably 50 to 300 parts by weight, based on 100 parts by weight of the resin solid ingredients of the vinyl polymer, from the viewpoint of printing density and facilitation in containing the pigment in the vinyl polymer.

The water dispersion of the vinyl polymer particles containing the pigment can be obtained by, for instance, dissolving a vinyl polymer in an organic solvent; adding a pigment to the resulting solution; pre-kneading the mixture; thereafter adding a neutralizing agent and water and kneading the resulting mixture, to prepare an oil-in-water type dispersion; and distilling off the organic solvent from the kneaded mixture.

The organic solvent is preferably an alcohol solvent, a ketone solvent and an ether solvent, and a hydrophilic organic solvent is more preferable.

The alcohol solvent includes methanol, ethanol, isopropanol, n-butanol, tertiary butanol, isobutanol, diacetone alcohol, and the like. The ketone solvent includes acetone, methyl ethyl ketone, diethyl ketone, methyl isobutyl ketone, and the like. The ether solvent includes dibutyl ether, tetrahydrofuran, dioxane, and the like. Among these solvents, isopropanol, acetone and methyl ethyl ketone are preferable.

In addition, the above organic solvent may be used together with a high-boiling point hydrophilic organic solvent, as occasion demands. The high-boiling point hydrophilic organic solvent includes phenoxyethanol, ethylene glycol monomethyl ether, diethylene glycol monomethyl ether, diethylene glycol monoethyl ether, diethylene glycol diethyl ether, and the like.

As the neutralizing agent, an acid or base can be used depending upon the kinds of the salt-forming groups. The acid includes inorganic acids such as hydrochloric acid and sulfuric acid; and organic acids such as acetic acid, propionic acid, lactic acid, succinic acid, glycolic acid, gluconic acid and glyceric acid. The base includes tertiary amines such as trimethylamine and triethylamine, ammonia, sodium hydroxide, potassium hydroxide, and the like.

The degree of neutralization is not limited to specified ones. It is preferable that the resulting water dispersion is usually neutral, for instance, pH is 4.5 to 9.

The particle diameter of the vinyl polymer particles containing the pigment is preferably 0.01 to 0.50 $\mu$m, more preferably 0.02 to 0.20 $\mu$m, from the viewpoint of prevention of clogging of the nozzles and the dispersion stability.

It is desired that the content of the water dispersion of the vinyl polymer in the water-based ink is adjusted such that the content of the vinyl polymer particles in the water-based ink is usually 1 to 30% by weight, preferably 2 to 15% by weight, from the viewpoints of printing density and discharging stability.

There can be added additives such as wetting-agents, dispersing agents, defoaming agents, mildewproof agents and chelating agents to the water-based ink for inkjet printing of the present invention.

As the wetting agents, there can be used polyhydric alcohols and ethers thereof such as ethylene glycol, propylene glycol, diethylene glycol, triethylene glycol, polyethylene glycols, glycerol, diethylene glycol diethyl ether, and diethylene glycerol mono-n-butyl ether; acetates; nitrogen-containing compounds such as N-methyl-2-pyrrolidone and 1,3-dimethylimidazolidinone. The content of the wetting agent in the water-based ink is preferably 0.1 to 50% by weight, more preferably 0.1 to 30% by weight.

In addition, as the dispersing agent, there can be used anionic, nonionic, cationic and amphoteric dispersing agents.

Also, as the defoaming agent, it is especially preferable to use the compound represented by the formula (III):

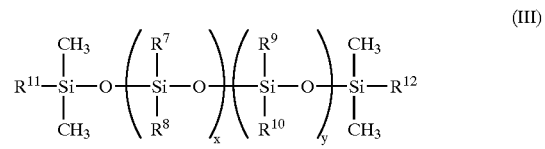

wherein each of $R^7$, $R^8$, $R^9$ and $R^{10}$ is independently an alkyl group having 1 to 10 carbon atoms, or phenyl group which may have a substituent; each of $R^{11}$ and $R^{12}$ is independently an alkyl group having 1 to 10 carbon atoms, phenyl group which may have a substituent, hydroxyl group, amino group, carboxyl group or epoxy group, respectively; each of x and y is independently a number of 0 to 1000, preferably 10 to 100, from the viewpoints of suppression of generation of foams during the preparation of the water-based ink and adjustment of surface tension of the water-based ink.

The content of the defoaming agent in the water-based ink is preferably 0.001 to 2.0% by weight, more preferably 0.005 to 0.5% by weight.

PREPARATION EXAMPLES 1 to 3

A reaction vessel was charged with 20 parts by weight of methyl ethyl ketone, monomers and a polymerization chain transfer agent which are listed in the column of "initially charged monomers" of Table 1, and nitrogen gas substitution was sufficiently carried out.

On the other hand, a dropping funnel was charged with monomers and a polymerization chain transfer agent which are listed in the column of "dropping monomers" of Table 1, 60 parts by weight of methyl ethyl ketone and 1.2 parts by weight of 2,2'-azobis(2,4-dimethylvaleronitrile), and nitrogen gas substitution was sufficiently carried out.

The mixed solution inside the reaction vessel was heated to 65° C. with stirring under nitrogen atmosphere, and the mixed solution inside the dropping funnel was slowly added dropwise thereto over a period of 3 hours. After 2 hours passed from the termination of dropping, thereto was added a solution prepared by adding 0.1 parts by weight of 2,2'-azobis(2,4-dimethylvaleronitrile) to 5 parts by weight of methyl ethyl ketone. The mixture was further aged at 65° C. for 2 hours and then at 70° C. for 2 hours, to give a copolymer solution.

A part of the resulting copolymer solution was isolated by drying it at 105° C. for 2 hours under reduced pressure to completely remove the solvent. The weight-average molecular weight was determined by gel permeation chromatography using polystyrene as a standard substance, and chloroform containing dodecyldimethylamine of 1 mmol/L as a solvent. As a result, each of the resulting copolymers had a weight-average molecular weight of about 10000.

Five parts by weight of the copolymer obtained by drying the resulting copolymer solution under reduced pressure was dissolved in 25 parts by weight of an organic solvent listed in Table 1, and 2 parts by weight of a neutralizing agent (30% aqueous solution) listed in Table 1 was added thereto to neutralize a part of the copolymer. Further, 30 parts by weight of ion-exchanged water and 5 parts by weight of a pigment were added thereto, and the mixture was kneaded with a beads mill.

The organic solvent was completely removed from the resulting kneaded product at 60° C. under reduced pressure, and a part of water was further removed, thereby giving a water dispersion of pigment-containing vinyl polymer particles, the concentration of the solid ingredients of which was 20% by weight.

PREPARATION EXAMPLE 4

A copolymer solution was obtained in the same manner as in Preparation Example 1 using the monomers and a polymerization chain transfer agent listed in Table 1. The weight-average molecular weight of the resulting copolymer was obtained in the same manner as in Preparation Example 1. As a result, it was found to be about 10000.

Twenty-five parts by weight of an organic solvent listed in Table 1 and 5 parts by weight of a dye or pigment were added to 5 parts by weight of the copolymer obtained by drying the resulting copolymer solution under reduced pressure, and completely dissolved. Two parts by weight of a neutralizing agent (30% aqueous solution) listed in Table 1 was added thereto to neutralize a part of the salt-forming group of the copolymer. Further, 300 parts by weight of ion-exchanged water was added thereto, and the mixture was stirred. Thereafter, the mixture was emulsified for 30 minutes by using a microfluidizer (manufactured by Microfluidics International Corporation).

Silicone Macromer: Manufactured by Chisso Corporation under the trade name: FM-0711 (number-average molecular weight: 1000, a compound represented by the formula (II-1a))

Pigment Red 122: Manufactured by Toyo Ink Manufacturing Co., Ltd., under the trade name: LIONOGEN Magenta R Pigment Yellow 17: Manufactured by DAINICHISEIKA COLOR & CHEMICALS MFG. CO., LTD., under the trade name: ECY-215

Carbon Black: Manufactured by Degussa, under the trade name: Printex-90

Spilon Red: Manufactured by Hodogaya Chemical Co., Ltd., under the trade name: Spilon Red C-BR Styrene Macromer A: Manufactured by TOAGOSEI CO., LTD., under the trade name: AN-6 (styrene-acrylonitrile macromer, styrene content: 75% by weight, number-average molecular weight: 6000, polymerizable functional group: methacroyloxy group)

Styrene Macromer B: Manufactured by TOAGOSEI CO., LTD., under the trade name: AS-6 (styrene macromer, number-average molecular weight: 6000, polymerizable functional group: methacroyloxy group)

TABLE 1

| | Preparation Examples | | | |
|---|---|---|---|---|
| | 1 | 2 | 3 | 4 |
| Initially Charged Monomers | | | | |
| | Styrene [10] | t-Butyl Methacrylate [20] | Styrene [10] | t-Butyl Methacrylate [20] |
| | 2-Ethylhexyl Acrylate [17] | Polyethylene Glycol Methacrylate [10] | n-Butyl Acrylate [10] | 2-Hydroxyethyl Methacrylate [5] |
| | 2-Hydroxyethyl Methacrylate [10] | Silicone Macromer [2] | 2-Hydroxyethyl Acrylate [5] | Silicone Macromer [5] |
| | Silicone Macromer [2] | Methacrylic Acid [4] | Polyethylene Glycol Methacrylate [5] | Acrylic Acid [10] |
| | Acrylic Acid [3] | n-Dodecylmercaptan [0.6] | Silicone Macromer [2] | t-Dodecylmercaptan [0.6] |
| | n-Dodecylmercaptan [0.6] | | Dimethylaminoethyl Acrylamide [10] | |
| | | | n-Hexylmercaptan [0.5] | |
| Dropping Monomers | | | | |
| | Styrene [10] | t-Butyl Methacrylate [32] | Styrene [10] | t-Butyl Methacrylate [22] |
| | 2-Ethylhexyl Acrylate [25] | Polyethylene Glycol Methacrylate [15] | n-Butyl Acrylate [14] | 2-Hydroxyethyl Methacrylate [10] |
| | 2-Hydroxyethyl Methacrylate [10] | Silicone Macromer [8] | 2-Hydroxyethyl Acrylate [10] | Silicone Macromer [10] |
| | Silicone Macromer [8] | Methacrylic Acid [6] | Polyethylene Glycol Methacrylate [5] | Acrylic Acid [15] |
| | Acrylic Acid [2] | n-Dodecylmercaptan [2.4] | Silicone Macromer [6] | t-Dodecylmercaptan [2.4] |
| | n-Dodecylmercaptan [2.4] | | Dimethylaminoethyl Acrylamide [10.5] | |
| | | | n-Hexylmercaptan [2.0] | |
| Pigment | | | | |
| | Pigment Red 122 | Pigment Yellow 17 | Carbon Black | Spilon Red (Dye) |
| Organic Solvent | | | | |
| | Methyl Ethyl Ketone | Acetone | Methyl Ethyl Ketone | Acetone |
| Neutralizing Agent | | | | |
| | Sodium Hydroxide | Ammonia | Glycolic Acid | Sodium Hydroxide |

(Note): Amounts of each ingredient inside parenthesis indicate parts by weight.

The organic solvent was completely removed from the resulting emulsion at 60° C. under reduced pressure, and water was further removed to concentrate the mixture, thereby giving a water dispersion of dye-containing vinyl polymer particles, the concentration of the solid ingredients of which was 20% by weight.

The names listed in Tables 1 and 3 mean the followings.

EXAMPLES 1 to 3

Forty parts by weight of the water dispersion of pigment-containing vinyl polymer particles obtained in Preparation Examples 1 to 3, 5 parts by weight of glycerol, 10 parts by weight of urea, 1 part by weight of acetylene glycol-polyethylene oxide adduct (manufactured by Kawaken Fine Chemicals Co., Ltd., under the trade name: Acetylenol EH) and 44 parts by weight of ion-exchanged water were mixed, and the resulting liquid mixture was filtered with a needleless syringe [manufactured by TERUMO CORPORATION] having a volume of 25 mL to which 0.5 μm filter [acetyl cellulose membrane, outer diameter: 2.5 cm, manufactured by Fuji Photo Film Co., Ltd.] was attached, thereby removing coarse grains, to give water-based inks of Examples 1 to 3 corresponding to Preparation Examples 1 to 3, respectively.

COMPARATIVE EXAMPLE 1

A water-based ink was obtained by the following formulation.

| (Formulation) | (Parts by Weight) |
|---|---|
| C.I. Acid Red 52 (Water-Soluble Dye) | 4 |
| Glycerol | 5 |
| Diethylene Glycol | 10 |
| Isopropyl Alcohol | 2 |
| Ion-Exchanged Water | 79 |

COMPARATIVE EXAMPLE 2

A water-based ink was obtained in the same manner as in Comparative Example 1, except for using 4 parts by weight of carbon black in place of C. I. Acid Red 52, and dispersing by using a sodium salt of an aromatic sulfonic acid-formalin condensation product (manufactured by Kao Corporation, under the trade name: Demole C).

COMPARATIVE EXAMPLE 3

A water-based ink was obtained in the same manner as in Example 1, except for using 40 parts by weight of a water dispersion of the dye-containing vinyl polymer particles obtained in Preparation Example 4 in place of the water dispersion of the pigment-containing vinyl polymer particles obtained in Preparation Example 1.

The physical properties for the water-based inks obtained in Examples 1 to 3 and Comparative Examples 1 to 3 were evaluated by the following methods. The results are shown in Table 2.

(1) Printing Density

Solid image printing was carried out on commercially available copy paper using a commercially available bubble jet printer manufactured by HEWLETT PACKARD (Model Number: Desk Jet-720C), and the printed image was allowed to stand at 25° C. for 1 hour, and thereafter the printing density was determined by using a Macbeth densitometer (manufactured by Macbeth Process Measurements Co., Product Number: RD914), and evaluated by the following evaluation criteria:

[Evaluation Criteria]
○: Printing density being not less than 1.1
Δ: Printing density being not less than 1.0 and less than 1.1
x: Printing density being less than 1.0

(2) Light Fastness

The solid printed object for which the printing density was determined above was continued to be irradiated for 10000 counts with Xenon Fade Meter (trade name, manufactured by ATLAS). Thereafter, the printing density of the same printing portion determined before irradiation was again determined with Macbeth densitometer RD914. The residual ratio of the printing density after irradiation to the printing density before irradiation was calculated by the following equation:

$$[\text{Residual Ratio}] = \frac{[\text{Printing Density After Irradiation}]}{[\text{Printing Density Before Irradiation}]} \times 100$$

The light fastness was evaluated on the basis of the following evaluation criteria:
[Evaluation Criteria]
○: Residual ratio being not less than 95%
Δ: Residual ratio being not less than 80% and less than 95%
x: Residual ratio being less than 80%

(3) Water Resistance

Solid image printing was carried out on a commercially available copy paper using the above-mentioned printer, and the printing density of a specified printed portion of the sample which was dried at 25° C. for 1 hour was determined. Thereafter, the printed paper was immersed vertically in stand-still water for 10 seconds, and then vertically pulled out therefrom in this state. The immersed paper was air-dried at 25° C. for 24 hours, and the printing density of the same printing portion as determined before immersion was again determined. The residual ratio of the printing density after immersion to the printing density before immersion was calculated by the equation:

$$[\text{Residual Ratio}] = \frac{[\text{Printing Density After Immersion}]}{[\text{Printing Density Before Immersion}]} \times 100$$

The water resistance was evaluated on the basis of the following evaluation criteria:
[Evaluation Criteria]
⊚: Residual ratio being not less than 95%
○: Residual ratio being not less than 90% and less than 95%
Δ: Residual ratio being not less than 70% and less than 90%
x: Residual ratio being less than 70%

(4) Rub Resistance

Solid image printing was carried out on a commercially available copy paper using the above-mentioned printer, and the printed surface was strongly rubbed with a finger. The extent of rub-off of the printed image was evaluated by the following evaluation criteria:
[Evaluation Criteria]
○: Substantially no printed image being rubbed off, and its periphery not being stained
Δ: Some printed image being rubbed off, its periphery being slightly stained, and finger also being slightly stained
x: Printed image being considerably rubbed off, its periphery being considerably stained, and finger also being considerably stained (5) High Lighter-Fastness Text printing was carried out on a commercially available copy paper using the above-mentioned printer, and after passage of 6 hours at 25° C., the extent of staining of the printed sample when traced with a commercially available aqueous fluorescent marker was observed with naked eyes, and the evaluation was made on the basis of the following evaluation criteria:
[Evaluation Criteria]
⊚: No staining such as rubbed stains was observed even when traced with a fluorescent marker.
○: Some rubbed stains were generated when traced with a fluorescent marker, but at a level without practical problems.
x: Generation of rubbed stains were observed when traced with a fluorescent marker, which was intolerable.

TABLE 2

Physical Properties of Water-Based Ink

| Ex. No. | Printing Density | Light Fastness | Water Resistance | Rub Resistance | High Lighter-Fastness |
|---|---|---|---|---|---|
| 1 | ○ | ○ | ⊚ | ○ | ○ |
| 2 | ○ | ○ | ⊚ | ○ | Δ |
| 3 | ○ | ○ | ⊚ | ○ | ○ |
| Comp. Ex. | | | | | |
| 1 | ○ | x | x | ○ | Δ |
| 2 | ○ | ○ | Δ | x | x |
| 3 | ○ | x | ⊚ | ○ | ○ |

(Note) In the table, the evaluation "x" means not usable.

It is clear from the results shown in Table 2 that all of the water-based inks obtained in each example are excellent in light fastness, and give high printing density, and further are excellent in water resistance, rub resistance and highlighter-fastness.

PREPARATION EXAMPLES 5 to 11

A reaction vessel was charged with 20 parts by weight of an organic solvent shown in Table 3, monomers and a polymerization chain transfer agent which are listed in the column of "initially charged monomers" of Table 3, and nitrogen gas substitution was sufficiently carried out.

On the other hand, a dropping funnel was charged with monomers and a polymerization chain transfer agent which are listed in the column of "dropping monomers" of Table 3, 60 parts by weight of methyl ethyl ketone, and 1.2 parts by weight of 2,2'-azobis(2,4-dimethylvaleronitrile), and nitrogen gas substitution was sufficiently carried out.

The mixed solution inside the reaction vessel was heated to 65° C. with stirring under nitrogen atmosphere, and the mixed solution inside the dropping funnel was slowly added dropwise thereto over a period of 3 hours. After 2 hours passed from the termination of dropping, thereto was added a solution prepared by adding 0.3 parts by weight of 2,2'-azobis(2,4-dimethylvaleronitrile) to 5 parts by weight of methyl ethyl ketone. The mixture was further aged at 65° C. for 2 hours and then at 70° C. for 2 hours, to give a copolymer solution.

A part of the resulting copolymer solution was isolated by drying it at 105° C. for 2 hours under reduced pressure to completely remove the solvent. The weight-average molecular weight was determined by gel permeation chromatography using polystyrene as a standard substance, and chloroform containing dodecyldimethylamine of 1 mmol/L as a solvent. The results are shown in Table 3.

Five parts by weight of the copolymer obtained by drying the resulting copolymer solution under reduced pressure was dissolved in 25 parts by weight of an organic solvent listed in Table 3, and a given amount of a neutralizing agent (30% aqueous solution) listed in Table 3 was added thereto to neutralize a part of the copolymer. Further, 5 parts by weight of a pigment was added thereto, and the mixture was kneaded with a beads mill.

Thirty parts by weight of ion-exchanged water was added to the resulting kneaded product, and the mixture was stirred. Thereafter, the organic solvent was removed from the resulting kneaded product at 60° C. under reduced pressure, and a part of water was further removed, thereby giving a water dispersion of pigment-containing vinyl polymer particles, the concentration of the solid ingredients of which was 20% by weight.

TABLE 3

| | Preparation Examples | | | |
|---|---|---|---|---|
| | 5 | 6 | 7 | 8 |
| Initially Charged Monomers | | | | |
| | t-Butyl Methacrylate [18] | Styrene [20] | t-Butyl Methacrylate [20] | Styrene [20] |
| | Acrylic Acid [2] | Methacrylic Acid [4] | N,N-Dimethylaminoethyl Methacrylate [20] | N,N-Dimethylaminoethyl Acrylate [2] |
| | Methoxypolytetramethylene Glycol(12) Methacrylate [10] | Butoxypolyethylene Glycol(9) Methacrylate [10] | Methoxypolyethylene Glycol(9) Methacrylate [5] | Methoxypolyethylene Glycol(23) Methacrylate [20] |
| | Styrene Macromer A [5] | Silicone Macromer [5] | Silicone Macromer [2] | Styrene Macromer A [5] |
| | 2-Hydroxyethyl Methacrylate [10] | Styrene Macromer B [5] | n-Dodecylmercaptan [0.2] | Mercaptoethanol [0.2] |
| | n-Dodecylmercaptan [0.3] | n-Dodecylmercaptan [0.3] | | |
| Dropping Monomers | | | | |
| | t-Butyl Methacrylate [20] | Styrene [25] | t-Butyl Methacrylate [23] | Styrene [23] |
| | Acrylic Acid [3] | Methacrylic Acid [4] | N,N-Dimethylaminoethyl Methacrylate [20] | N,N-Dimethylaminoethyl Acrylate [3] |
| | Methoxypolytetramethylene Glycol(12) Methacrylate [15] | Butoxypolyethylene Glycol(9) Methacrylate [15] | Methoxypolyethylene Glycol(9) Methacrylate [5] | Methoxypolyethylene Glycol(23) Methacrylate [20] |
| | Styrene Macromer A [5] | Silicone Macromer [5] | Silicone Macromer [3] | Styrene Macromer A [5] |
| | 2-Hydroxyethyl Methacrylate [10] | Styrene Macromer B [5] | n-Dodecylmercaptan [1.8] | Mercaptoethanol [1.8] |
| | n-Dodecylmercaptan [1.7] | n-Dodecylmercaptan [1.7] | | |
| Weight-Average Molecule Weight | | | | |
| | 11000 | 38000 | 24000 | 21000 |
| Pigment | | | | |
| | Pigment Red 122 | Pigment Yellow 17 | Carbon Black | Carbon Black |
| Organic Solvent | | | | |
| | Methyl Ethyl Ketone | Acetone | Methyl Ethyl Ketone | Methyl Ethyl Ketone |

TABLE 3-continued

Preparation Examples

Neutralizing Agent

| Sodium Hydroxide [0.5] | Ammonia [0.3] | Glycolic Acid [3.2] | Acetic Acid [0.4] |
|---|---|---|---|
| | 9 | 10 | 11 |

| | 9 | 10 | 11 |
|---|---|---|---|
| Initially Charged Monomers | Styrene [7.5]<br>n-Dodecyl Methacrylate [3]<br>N,N-Dimethylaminoethyl Methacrylate [10]<br>Methoxypolyethylene Glycol(4) Methacrylate [20]<br>Styrene Macromer B [5]<br>Mercaptoethanol [0.2] | Styrene [8]<br>N,N-Dimethylaminoethyl Methacrylate [15]<br>Methoxypolyethylene Glycol(4) Methacrylate [15]<br>2-Hydroxyethyl Methacrylate [2]<br>Silicone Macromer [1]<br>Styrene Macromer B [5]<br>Mercaptoethanol [0.2] | Styrene [15]<br>Methyl Methacrylate [4.5]<br>N,N-Dimethylaminoethyl Methacrylate [25]<br>Styrene Macromer B [5]<br>Mercaptoethanol [0.2] |
| Dropping Monomers | Styrene [7.5]<br>n-Dodecyl Methacrylate [5]<br>N,N-Dimethylaminoethyl Methacrylate [15]<br>Methoxypolyethylene Glycol(4) Methacrylate [20]<br>Styrene Macromer B [5]<br>Mercaptoethanol [1.8] | Styrene [10]<br>N,N-Dimethylaminoethyl Methacrylate [15]<br>Methoxypolyethylene Glycol(4) Methacrylate [18]<br>2-Hydroxyethyl Methacrylate [3]<br>Silicone Macromer [1]<br>Styrene Macromer B [5]<br>Mercaptoethanol [1.8] | Styrene [15]<br>Methyl Methacrylate [4.5]<br>N,N-Dimethylaminoethyl Methacrylate [25]<br>Styrene Macromer B [5]<br>Mercaptoethanol [0.8] |
| Weight-Average Molecular Weight | 15000 | 43000 | 37000 |
| Pigment | Carbon Black | Carbon Black | Carbon Black |
| Organic Solvent | Methyl Ethyl Ketone | Methyl Ethyl Ketone | Methyl Ethyl Ketone |
| Neutralizing Agent | Gluconic Acid [5.2] | Glyceric Acid [2.9] | Gluconic Acid [10.4] |

(Note): Amounts of each ingredient inside parenthesis indicate parts by weight.

EXAMPLES 4 to 10

Forty parts by weight of the water dispersion of pigment-containing vinyl polymer particles obtained in Preparation Examples 5 to 11, 5 parts by weight of glycerol, 10 parts by weight of urea, 1 part by weight of acetylene glycol-polyethylene oxide adduct (manufactured by Kawaken Fine Chemicals Co., Ltd., under the trade name: Acetylenol EH) and 44 parts by weight of ion-exchanged water were mixed, and the resulting liquid mixture was filtered with a needle-less syringe [manufactured by TERUMO CORPORATION] having a volume of 25 mL to which 0.5 μm filter (acetyl cellulose membrane, outer diameter: 2.5 cm, manufactured by Fuji Photo Film Co., Ltd.) was attached, thereby removing coarse grains, to give water-based inks of Examples 4 to 10 corresponding to Preparation Examples 5 to 11, respectively.

Printing density, light fastness, water resistance, rub resistance and highlighter-fastness were evaluated for the water-based inks obtained in Examples 4 to 10 in the same manner as in Examples 1 to 3.

In addition, distortions of the recording medium were evaluated for the water-based inks obtained in Examples 4 to 10 and the water-based inks obtained in Comparative Examples 1 to 3 in accordance with the following method. The results are shown in Table 4.

(6) Distortion of Printed Objects

The extent of distortion when printing a ruled line using the above-mentioned printer was observed with naked eyes, and evaluated by the following evaluation criteria:

[Evaluation Criteria]
⊚: No distortion
○: Almost no distortion
Δ: Some distortions
x: Much distortions

TABLE 4

| | Physical Properties of Water-Based Ink | | | | | |
|---|---|---|---|---|---|---|
| Ex. No. | Printing Density | Distortion of Printed Object | Light Fastness | Water Resistance | Rub Resistance | High Lighter-Fastness |
| 4 | ○ | ⊚ | ○ | ⊚ | ○ | ⊚ |
| 5 | ○ | ○ | ○ | ⊚ | ○ | ○ |
| 6 | ○ | ○ | ○ | ⊚ | ○ | ⊚ |
| 7 | ○ | ⊚ | ○ | ⊚ | ○ | ○ |
| 8 | ○ | ⊚ | ○ | ⊚ | ○ | ○ |

TABLE 4-continued

| | Physical Properties of Water-Based Ink | | | | | |
|---|---|---|---|---|---|---|
| | Printing Density | Distortion of Printed Object | Light Fastness | Water Resistance | Rub Resistance | High Lighter-Fastness |
| 9 | ○ | ○ | ○ | ⊚ | ○ | ○ |
| 10 | ○ | Δ | ○ | ⊚ | ○ | ○ |
| Comp. Ex. | | | | | | |
| 1 | ○ | ⊚ | x | x | ○ | Δ |
| 2 | ○ | Δ | ○ | Δ | x | x |
| 3 | ○ | x | x | ⊚ | ○ | ○ |

(Note) In the table, the evaluation "x" means not usable.

It is clear form the results shown in Table 4 that all of the water-based inks obtained in each example are excellent in light fastness, and give high printing density, with no distortions of the printed objects, and are excellent in water resistance, rub resistance and highlighter-fastness.

INDUSTRIAL APPLICABILITY

The water-based ink for inkjet printing of the present invention is excellent in light fastness, gives high printing density, with no distortion of printed objects, and further is excellent in water resistance, rub resistance and highlighter-fastness.

What is claimed is:

1. A water-based ink for inkjet printing comprising a water dispersion of vinyl polymer particles prepared by containing a pigment in a vinyl polymer prepared by copolymerizing a monomer mixture comprising (a) a salt-forming group-containing monomer, (b) a styrene macromer having a polymerizable functional group at one end, and (c) at least one monomer copolymerizable with the salt-forming group-containing monomer and the styrene macromer, which monomer is a styrenic monomer;

and wherein the content of the styrenic monomer in the vinyl polymer is 10 to 60% by weight.

2. The water-based ink according to claim 1, wherein the monomer mixture comprises additionally at least one member selected from the group consisting of (d) hydroxyl group-containing monomers, and (e) monomers represented by the formula (I):

$$CH_2=C(R^1)COO(R^2O)_pR^3 \quad (I)$$

wherein $R^1$ is hydrogen atom or a lower alkyl group; $R^2$ is a divalent hydrocarbon group having 1 to 30 carbon atoms, which may have a hetero-atom; $R^3$ is a monovalent hydrocarbon group having 1 to 30 carbon atoms, which may have a hetero-atom; and p is a number of 1 to 60.

3. The water-based ink according to claim 1, wherein the weight-average molecular weight of the vinyl polymer is 3000 to 200000.

4. The water-based ink according to claim 1, wherein the monomer mixture comprises additionally a (meth)acrylic acid ester.

5. A process for preparing a water-based ink for inkjet printing comprising a water dispersion of vinyl polymer particles prepared by containing a pigment in a vinyl polymer, comprising dissolving in an organic solvent a vinyl polymer prepared by copolymerizing a monomer mixture comprising (a) a salt-forming group-containing monomer, (b) a styrene macromer having a polymerizable functional group at one end, and (c) at least one monomer copolymerizable with the salt-forming group-containing monomer and the styrene macromer, which monomer is a styrenic monomer; adding a pigment to the resulting solution; pre-kneading the mixture; thereafter adding a neutralizing agent and water, and kneading the mixture, to give an oil-in-water dispersion; and distilling off the organic solvent from the resulting kneaded product, wherein the content of the styrenic monomer in the vinyl polymer is 10 to 60% by weight.

6. The process for preparing a water-based ink according to claim 5, wherein the monomer mixture comprises additionally at least one member selected from the group consisting of (d) hydroxyl group-containing monomers, and (e) monomers represented by the formula (I):

$$CH_2=C(R^1)COO(R^2O)_pR^3 \quad (I)$$

wherein $R^1$ is hydrogen atom or a lower alkyl group; $R^2$ is a divalent hydrocarbon group having 1 to 30 carbon atoms, which may have a hetero-atom; $R^3$ is a monovalent hydrocarbon group having 1 to 30 carbon atoms, which may have a hetero-atom; and p is a number of 1 to 60.

* * * * *

UNITED STATES PATENT AND TRADEMARK OFFICE
CERTIFICATE OF CORRECTION

PATENT NO.     : 6,852,777 B1
DATED          : February 8, 2005
INVENTOR(S)    : Nakano et al.

It is certified that error appears in the above-identified patent and that said Letters Patent is hereby corrected as shown below:

<u>Title page,</u>
Item [75], should read
-- [75] Inventors: Yukihiro Nakano, Wakayama (JP)
                     Isao Tsuru, Wakayama (JP)
                     Koji Azuma, Wakayama (JP)
                     Michitaka Sawada, Wakayama (JP)
                     Takehiro Tsutsumi, Wakayama (JP) --.

Signed and Sealed this

Sixteenth Day of August, 2005

JON W. DUDAS
*Director of the United States Patent and Trademark Office*